US006631848B1

(12) United States Patent
Gaultier

(10) Patent No.: US 6,631,848 B1
(45) Date of Patent: Oct. 14, 2003

(54) METHOD OF CONTROLLING AN ELECTRONIC CIRCUIT

(75) Inventor: Jean-Marie Gaultier, Rousset (FR)

(73) Assignee: STMicroelectronics S.A., Gentilly (FR)

( * ) Notice: Subject to any disclaimer, the term of this patent is extended or adjusted under 35 U.S.C. 154(b) by 0 days.

(21) Appl. No.: 09/437,660

(22) Filed: Nov. 10, 1999

(30) Foreign Application Priority Data

Nov. 10, 1998 (FR) .............................................. 98 14136

(51) Int. Cl.$^7$ .............................................. G06K 19/06
(52) U.S. Cl. ........................ 235/492; 235/380; 235/451
(58) Field of Search ................................ 235/379, 375, 235/492, 474, 462.15; 395/825, 840

(56) References Cited

U.S. PATENT DOCUMENTS

| | | | | |
|---|---|---|---|---|
| 4,874,935 A | * | 10/1989 | Younger | 235/492 |
| 5,365,045 A | * | 11/1994 | Iijima | 235/380 |
| 5,517,460 A | * | 5/1996 | Yamaguchi | 365/233 |
| 5,796,092 A | * | 8/1998 | Nagata et al. | 235/492 |
| 5,818,030 A | * | 10/1998 | Reyes | 235/492 |
| 5,847,374 A | * | 12/1998 | Menconi | 235/492 |
| 5,901,303 A | * | 5/1999 | Chew | 395/400 |
| 5,901,329 A | * | 5/1999 | Kito | 710/8 |
| 5,905,245 A | * | 5/1999 | Tanaka | 235/375 |
| 5,942,738 A | * | 8/1999 | Cesaire et al. | 235/380 |
| 6,036,088 A | * | 3/2000 | Itoh et al. | 235/375 |
| 6,036,100 A | * | 3/2000 | Asami | 235/492 |
| 6,038,632 A | * | 3/2000 | Yamazaki et al. | 710/260 |
| 6,092,133 A | * | 7/2000 | Erola et al. | 710/301 |
| 6,161,762 A | * | 12/2000 | Bashan et al. | 235/492 |
| 6,164,549 A | * | 12/2000 | Richards | 235/492 |
| 6,198,657 B1 | * | 3/2001 | Uekubo et al. | 365/185.04 |
| 6,213,392 B1 | * | 4/2001 | Zuppicich | 235/380 |
| 6,220,510 B1 | * | 4/2001 | Everett et al. | 235/380 |

FOREIGN PATENT DOCUMENTS

| | | |
|---|---|---|
| EP | 0 585 132 A1 | 3/1994 |
| FR | 2 758 027 | 7/1998 |

OTHER PUBLICATIONS

French Search Report dated Aug. 17, 1999 with annex to French Application No. 98/14136.

* cited by examiner

*Primary Examiner*—Michael G. Lee
*Assistant Examiner*—Ahshik Kim
(74) *Attorney, Agent, or Firm*—Lisa K. Jorgenson; Stephen Bongini; Fleit, Kain, Gibbons, Gutman & Bongini P.L.

(57) ABSTRACT

A method of controlling an electronic circuit is provided. A command is received from a control unit. The command is interpreted in either a first manner if the command is followed by a predetermined dead time, or a second manner if a new command is transmitted before expiration of the predetermined dead time. In a preferred embodiment, the command is interpreted in the second manner only if the new command is identical to the command. Also provided is a chip card that includes an antenna, at least one memory, and a control circuit. When a command is received, the control circuit performs either a first function if the command is followed by a predetermined dead time, or a second function if a new command is transmitted before expiration of the predetermined dead time. Additionally, a telephone apparatus is provided that includes a read/write device for contactless control of a chip card. The read/write device includes an antenna and a control circuit. When a command is transmitted, the control circuit either allows a predetermined dead time to pass to instruct the chip card to perform a first function, or transmits a new command before expiration of the predetermined dead time to instruct the chip card to perform a second function.

23 Claims, 1 Drawing Sheet

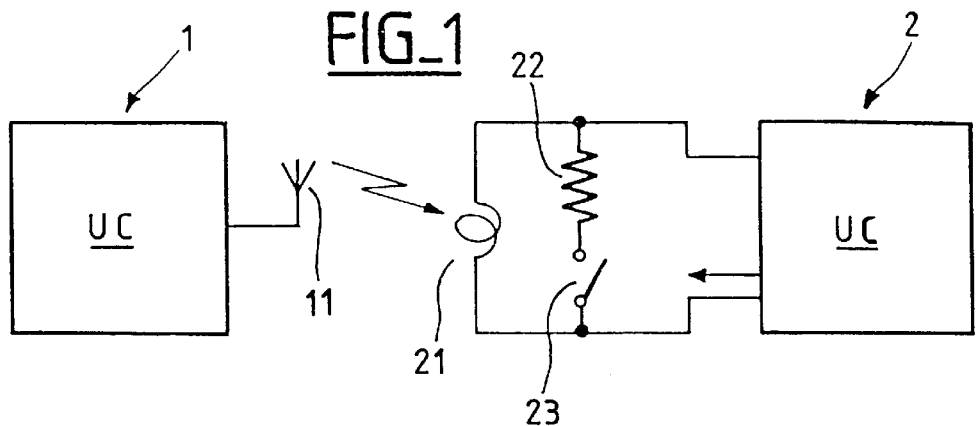
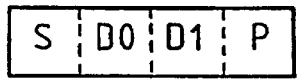 
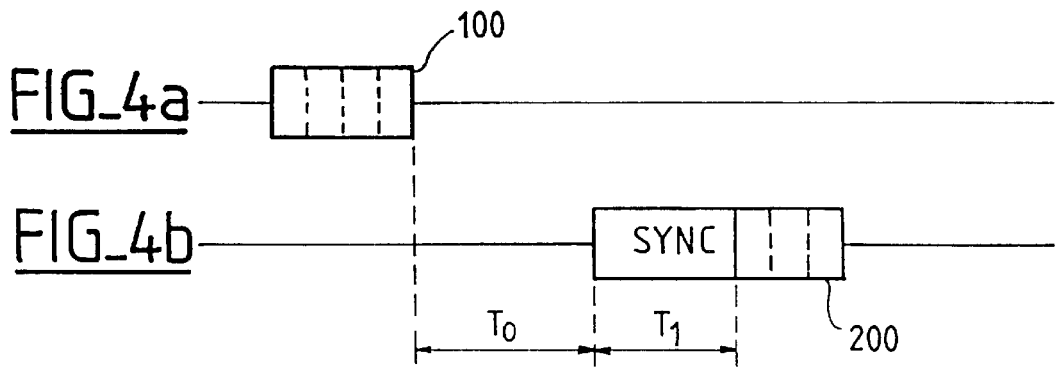
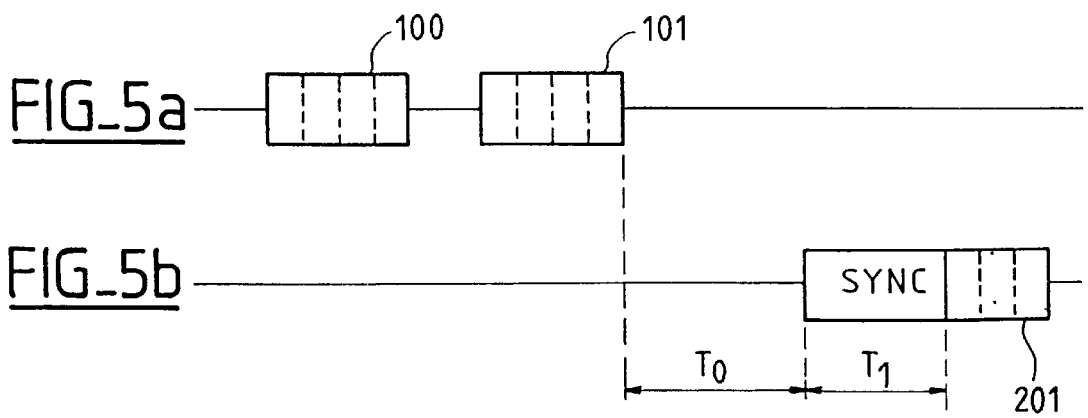

METHOD OF CONTROLLING AN ELECTRONIC CIRCUIT

CROSS-REFERENCE TO RELATED APPLICATIONS

This application is based upon and claims priority from prior French Patent Application No. 98-14136, filed Nov. 10, 1998, the entire disclosure of which is herein incorporated by reference.

BACKGROUND OF THE INVENTION

1. Field of the Invention

The present invention relates to electronic circuits, and more specifically to a method of controlling an electronic circuit such as the memory of a chip card.

2. Description of Related Art

The control of contactless chip cards, such as bank cards, telephone cards, and the like, is carried out at a distance through an electromagnetic wave, which is generally in the radio frequency spectrum. For this purpose, a control unit is equipped with an antenna and circuitry for generating, modulating, and transmitting a wave of the abovementioned type in order to transmit data to an antenna at the level of the card. The wave generally has sufficient energy for remotely powering the card's logic circuits.

The card includes circuitry for transforming the electromagnetic energy received by its antenna into both a regulated voltage supply and binary data that can be exploited by the logic circuits. In response, data can then be sent from the card to the control unit in accordance with the load modulation principle. Such a modulation consists of varying the current consumption at the level of the card's antenna. This variation creates a perturbation that induces a voltage variation detectable at the antenna of the control unit. The control unit has circuitry for processing and shaping this voltage variation in order to retrieve the data transmitted by the card.

Telephone cards presently in circulation in many countries are equipped with contacts. For their control, they are accessed via metallic pads that come into electrical contact with the terminals of the control unit (or reader). Efforts have been going on for some time to replace existing contact-type telephone cards and their associated readers with equivalent products that can support a contactless type of control, but without having to modify the structure of the logic circuits of the present cards or their basic functioning.

While it is desirable to escape the problems inherent in transmission through contacts (e.g., positioning errors between the reader's terminals and the pads on the card, wear or oxidation of the terminals and/or the pads, and heat build-up), there is a reluctance to discard the technical consensus regarding the cards themselves that was agreed upon by the various parties (e.g., card manufacturers, card reader manufacturers, and telephone operators). Thus, the problem becomes implementing present data transmission methods based on electromagnetic waves to create a contactless interface between the present types of readers and cards.

The present methods for transmitting data by electronic wave comply with specification standards, such as the "ISO 14443-2 type B" standard used in France. These standards particularly define the frequency, power level, types of coding, and electromagnetic transmission spectrum over the transmission channel. In addition, present telephone cards only accept a very small number of commands, of which at least some command words are ill suited for remote control conforming to the abovementioned specifications.

For example, a command to read out from the memory of a telephone card causes two distinct commands to be executed: the incrementation of the card's address counter, and the readout of data stored in the card's memory at the address indicated by the current value of the counter (as well as the transmission of that data to the reader). Accordingly, to read the data stored at an address n+m (where n and m are whole numbers and n designates the current value of the address counter), a sequence of m successive readout commands must be executed. This sequence involves the alternating transmission of m command words from the reader to the card and m data words from the card to the reader.

Because of the operating principle of the contactless cards outlined in the introduction, the "ISO 14443-2 type B" standard imposes a certain delay between each of these transmissions. The delay allows the control unit to pass over from the transmission mode to the reception mode and vice-versa (this is known as the "turnaround" of the control unit's antenna). These dead or silent times, during which no data is transmitted in either direction, are on the order of 150 $\mu$s (microseconds). It can be understood that executing a command of the type described above in compliance with the "ISO 14443-2 type B" specification can cause the average access time to be considerable, and in any case hardly compatible with the speed constraints called for by the application.

A possible solution is to increase the number of commands recognized by the card. For example, two distinguished commands could be provided: one for the address counter incrementation function and another for the data readout and transmission function. Then, to read out the data at address n+m, it would be necessary to transmit the first command m times and the second command just once. Because only the second command requires a turnaround at the control unit's antenna, and hence a dead time, the average memory access time is reduced. However, it is not possible to make such an increase in the number of commands without an in-depth modification in the structure of the telephone card's logic circuits. Moreover, increasing the number of distinct commands makes it necessary to increase the size of the binary words that encode these commands (i.e., the command words). In general, there arises a problem in all applications in which the number of distinct commands is limited.

SUMMARY OF THE INVENTION

In view of these drawbacks, it is an object of the present invention to overcome the above-mentioned drawbacks and to provide a method of controlling an electronic circuit. The same command is interpreted in a first manner in a first manner if it is followed by a predetermined dead time, and in a second manner if a new command is transmitted before expiration of the predetermined dead time. Thus, it is possible to increase the number of command functions without increasing the number of commands.

One embodiment of the present invention provides a method of controlling an electronic circuit in which a command is received from a control unit. The command is interpreted in either a first manner if the command is followed by a predetermined dead time, or a second manner if a new command is transmitted before expiration of the predetermined dead time. In a preferred embodiment, the command is interpreted in the second manner only if the new command is identical to the command.

Another embodiment of the present invention provides a chip card that includes an antenna, at least one memory, and a control circuit. When a command is received, the control circuit performs either a first function if the command is followed by a predetermined dead time, or a second function if a new command is transmitted before expiration of the predetermined dead time.

Yet another embodiment of the present invention provides a telephone apparatus that includes a read/write device for contactless control of a chip card. The read/write device includes an antenna and a control circuit. When a command is transmitted, the control circuit either allows a predetermined dead time to pass to instruct the chip card to perform a first ftnction, or transmits a new command before expiration of the predetermined dead time to instruct the chip card to perform a second function. In one preferred embodiment, the predetermined dead time is at least as long as a time necessary to transition the read/write device from a transmission mode to a reception mode.

Other objects, features, and advantages of the present invention will become apparent from the following detailed description. It should be understood, however, that the detailed description and specific examples, while indicating preferred embodiments of the present invention, are given by way of illustration only and various modifications may naturally be performed without deviating from the present invention.

BRIEF DESCRIPTION OF THE DRAWINGS

FIG. 1 is a block diagram of an exemplary system for implementing the control method of the present invention;

FIG. 2 shows the structure of a command word transmitted by the control unit;

FIG. 3 shows the structure of a command word sent by the electronic circuit;

FIGS. 4a and 4b are timing diagrams of binary words that are sent respectively by the control unit and the card in a case in which there is a predetermined dead time; and FIGS. 5a and 5b are timing diagrams of binary words that are transmitted respectively by the control unit and the card in a case in which there is not a predetermined dead time.

DETAILED DESCRIPTION OF PREFERRED EMBODIMENTS

Preferred embodiments of the present invention will be described in detail hereinbelow with reference to the attached drawings.

FIG. 1 shows an exemplary system for implementing the control method of the present invention. As shown, a control unit 1 includes a control circuit UC coupled to an antenna 11. The control unit incorporates the circuitry necessary to accomplish the functions necessary for the specific application, and the circuitry for electromagnetically interfacing with an electronic circuit 2. In the following description, the present invention is illustratively applied to an application involving a telephone apparatus. In accordance with such an application, the electronic circuit 2 is a telephone card (chip card) and the control unit 1 is a read/write device (reader) that can read from and write to a memory of the card 2.

In this exemplary embodiment, in order to provide the electromagnetic interfacing with the card 2 (e.g., in compliance with the "ISO 14443-2 type B" standard specification), the reader includes circuitry for generating a sinusoidal modulated electromagnetic wave whose carrier has a frequency of 13.56 MHZ (Megahertz). This electromagnetic wave is sufficiently powerful to remotely supply the logic circuits on the card 2 at a distance of approximately 10 cm (centimeters). Such a remote power supply energy is on the order of 1.5 A/m (amps per meter). The carrier wave is modulated in accordance with an ASK (Amplitude Shift Keying) modulation, which is a form of amplitude modulation. The modulation depth is of at least 10%. This modulation allows command words to be transmitted from the reader 1 to the card 2.

The card 2 includes an antenna 21 coupled to a control circuit UC that incorporates the necessary circuitry, including a memory, for carrying out the card function in the application. The card also includes circuitry for providing the electromagnetic interface with the reader 1. This circuitry transforms the electromagnetic energy received on the antenna 21 into a power supply voltage regulated at 3V (volts) for supplying the logic circuits of the card 2. In addition, this circuitry demodulates and decodes to retrieve the bits that form the command messages transmitted by the reader 1. Furthermore, this circuitry includes an impedance device 22 in series with a controllable switch 23.

Thus, the impedance device 22 can be selectively put into the circuit in parallel with the antenna 21 to cause the load on the antenna to vary according to the open or closed state of the switch (a series connection can alternatively be used). The state of the switch 23 is controlled by the control circuit UC of the card 2 in order to transmit data words from the card 2 to the reader 1 (in particular, the data read from the card's memory) using the load modulation principle described above. In order to improve this transmission, the data is encoded in accordance with BPSK (Binary Phase Shift Keying) to provide a two-phase modulation. This coding uses a sub-carrier at a frequency fs equal to fcc/16 (i.e., 847 kHz (kilohertz) in accordance with the "ISO 14443-2 type B" standard). For each transition in the data to be transmitted, the signal at frequency fs that controls switch 23 undergoes a 180° phase hop. The transmission of information from the card reader to the card or from the card to the card reader takes place at a speed of 106 Kbits/s (kilobits per second). The time for transmitting one bit is therefore 1/106 kHz.

FIG. 2 shows a four-bit command word that is transmitted from the reader to the card. The first bit S, which is known as the start bit, is a service bit used for synchronizing the data transfer. It has an exemplary binary value of zero. The next two bits D0 and D1, which are known as command bits, are useful data bits that are used to encode the transmitted command. With two command bits, it is only possible to have four distinct commands. For current telephone cards, only three distinct commands are used. More specifically, a first command is the readout command that functions to increment the address counter and to read out the data stored in the card's memory at the address corresponding to the current value of the address counter after incrementation. The data is then transmitted to the reader.

A second command is the initialization command that functions to initialize (or reset-to-zero) the card's address counter and to read out the data stored in the card's memory at the address corresponding to the current value of the address counter after initialization (i.e., the zero address). The data is then transmitted to the reader. A third command is the programming command that function to program the card's memory cell located at the address corresponding to the current value of the address counter (on condition that the cell is located in a memory zone accessible for writing). The command word of FIG. 2 ends with a fourth bit P, which is known as the control bit, that is a service bit used by the card for controlling the validity of the data received. The control used in current telephone cards is a parity control. The value of the P bit is thus determined by the product of the exclusive OR (XOR) function applied to the D0 and D1 bits.

FIG. 3 shows the structure of a data word transmitted from the card to the reader. The word is composed of three bits, with the first bit S being identical to and functioning the same as the S bit of the command word described above with reference to FIG. 2. The second bit D is the data bit read from the card's memory in response to the first or. second commands described above. The third bit ND is the binary complement of the D bit. Consequently, the information bit read from the memory is sent twice within the same word, including once in complementary form. This implies two transitions and thus two phase hops in the sub-carrier signal at frequency fs. Detection by the reader is thereby improved.

There shall now be described the operation of the method according to a preferred embodiment of the present invention for two different cases. The first case is described with reference to FIGS. 4a and 4b, and the second case is described with reference to FIGS. 5a and 5b. For each case, it shall be assumed that upon startup the card's address counter is at value n, where n is a whole number. In the first case (FIGS. 4a and 4b), the reader transmits a command word 100 (FIG. 4a) to send a given command C, such as a readout command. Thereafter, the reader transmits no more commands for a time T0, which is referred to as the "dead time" or "silent time".

The purpose of the dead time T0 is to allow the reader to switch over from the transmission mode to the reception mode. In particular, the reader utilizes this time to deactivate the circuitry modulating the carrier wave at frequency fcc and to activate the circuitry for detecting voltage variations on the reader's antenna 11. This is known as the "antenna turnaround". Indeed, it can be understood that the antenna 11, over which the electromagnetic wave at frequency fcc is continuously transmitted, turns over from the role of transmitting information by amplitude modulation to detecting information sent from the card by modulating the load on the antenna 21. According to the standard specifications, the dead time T0 is equal to 120/fs (i.e., 141 $\mu$s).

The card's logic circuits increment the address counter by one unit so that its value changes to n+1, and then cause the readout of the data stored at address n+1 of the card's memory. Upon expiration of the dead time T0 that follows reception of command 100, the card's logic circuits cause a data word 200 to be transmitted (FIG. 4b). For this purpose, the load on the antenna 21 is modulated at frequency fs for a time period T1 following the expiration of time T0, so as to allow the reader to synchronize with the card. After time period T1, a first phase hop generated on the signal modulating the load on the antenna 21 constitutes the start bit S of data word 200, remainder of which is then transmitted.

In accordance with the method of the present invention, another interpretation of the same command C transmitted by the reader is made in the second case in which a new command is issued in the dead time T0 (i.e., when a new command is received by the card before expiration of the dead time T0). In the second case (FIGS. 5a and 5b), the reader transmits the command word 100 and then sends a new command word 101 before a time equal to T0 elapses. The new command word 101 can carry the same command C as the original command word 100, or another command. In other words, the nature of the command transmitted with the second word 101 does not influence the interpretation of the command sent with the first word 100, but rather the interpretation is based on the time period that separates the transmission of the two command words 100 and 101.

In the second case, the command C transmitted with the first command word 100 only causes the address counter to be incremented by one unit to change its value to n+1. The command C does not cause, as in the first case, the readout and then transmission of the data stored at address n+1 of the card's memory. If it is presumed that the command transmitted with the second command word 101 is the same command C transmitted with the first command word 100, and if the second command word 101 is followed by the dead time T0. Then, word 201 (FIG. 5b) is transmitted in the same manner as word 200 in the first case described above.

However, the data transmitted by word 201 is the data stored at address n+2 of the card's memory. More specifically, command C sent with the second command word 101 has been interpreted in the same manner as in the first case and has thus caused a new incrementation of the card's address counter (to n+2).

Consequently, according to the present invention, the same command C is interpreted in different manners as a function of what happens during a predetermined time period following its transmission.

With the two command functions attributed to the readout command in the embodiment described above, the present invention can provide time savings when reading out the data stored at the n+m address of the card's memory. Indeed, only the data stored at the n+m address is transmitted by the card. Further, the m−1 command words transmitted consecutively to bring the card's address counter to the value n=m−1 are not separated from each other by the time interval T0. This sequence of command words, whose function is merely to bring the address counter to the penultimate value before the intended value, is therefore transmitted more quickly.

The principle of the present invention is naturally applicable to all commands, and not only to the readout command considered above. For instance, the initialization command described above for the telephone card can be interpreted in a first manner so as to accomplish the above-mentioned functions of initializing the card's address counter, reading the data stored at the zero address of the card's memory, and transmitting that data to the reader in the case when the dead time passes. And, in accordance with the present invention, the initialization command can be interpreted in a second manner so as to only accomplish the function of initializing the address counter when the dead time does not pass between commands.

In the embodiment of the present invention described above, a given command is interpreted in the second manner whenever a new command, irrespective of the specific command type, is transmitted by the control unit before the expiration of the dead time T0 following the transmission of the command. However, in further embodiments, the command is interpreted in the second manner only if the same command is once again transmitted (that is iterated) before the expiration of the dead time T0. In other words, it is necessary for the new command, which is transmitted before the expiration of the dead time T0 following the transmission of a given command, to be identical to the given command.

For example, the programming command for the telephone card described above can be interpreted in a first manner so as to accomplish the above-mentioned programming function in the case in which the dead time passes. The programming command can be interpreted in a second manner so as to illustratively accomplish the function of erasing the data stored in the card's memory at the address corresponding to the current value of the address counter, only if this same command is repeated before the dead time passes.

The present invention is particularly suited for use with a telephone apparatus including a read/write device for the contactless control of a chip card (telephone card). According to one embodiment, the apparatus complies with the "ISO 14443-2 type B" standard with regard to the electromagnetic interfacing with the card. In such a case, the duration of the above-mentioned dead time T0 is at least equal to the time required for the read/write device to pass from the transmission mode to the reception mode. However, the method of the present invention can also be applied to the control of any electronic circuit, and not only the memory of a chip card. Moreover, the control can be of any type (e.g., contactless or through contacts). The transmission channel that separates the electronic circuit from the control unit can also be of any nature.

For clarity, several of the expressions used above will now be defined. "Dead time" designates the period of time during which no data is sent by either the control unit or the electronic circuit. In general, a "new command" is a command sent in succession to a previous command, and can be identical to or different from the previous command. The description of a command being "interpreted in a first or second manner" is equivalent to stating that the command causes the execution of one command function or another command function in the electronic circuit. A "validly received" command is a command that has been correctly received in accordance with the communication protocol between the control unit and the electronic circuit. For example, if the transmitted messages includes control bits, a command is considered as validly received if the control bits extracted from the message indicate that the transmission is correct. This limits interpretation errors due to perturbations on the transmission channel.

While there has been illustrated and described what are presently considered to be the preferred embodiments of the present invention, it will be understood by those skilled in the art that various other modifications may be made, and equivalents may be substituted, without departing from the true scope of the present invention. Additionally, many modifications may be made to adapt a particular situation to the teachings of the present invention without departing from the central inventive concept described herein. Furthermore, an embodiment of the present invention may not include all of the features described above. Therefore, it is intended that the present invention not be limited to the particular embodiments disclosed, but that the invention include all embodiments falling within the scope of the appended claims.

What is claimed is:

1. A method of controlling an electronic circuit, said method comprising the steps of:
    receiving a first command word from a control unit; and
    executing the first command word in either a first manner so as to perform a first function if the first command word is followed by a predetermined dead time, or a second manner so as to perform a second function, which is different from the first function, if a new command word is transmitted before expiration of the predetermined dead time.

2. The method as defined in claim 1, wherein in the executing step, the first command word is executed in the second manner only if the new command word is validly received by the electronic circuit before the expiration of the predetermined dead time.

3. The method as defined in claim 1, wherein in the executing step, the first command word is executed in the second manner only if the new command word is identical to the first command word.

4. The method as defined in claim 3, wherein the first command word represents a program/erase command, and the executing step includes the sub-steps of:
    when the first command word is executed in the first manner, programming at least one memory cell based on the value of an address counter; and
    when the first command word is executed in the second manner, erasing the memory cell.

5. The method as defined in claim 1, wherein the first command word represents a readout command, and the executing step includes the sub-steps of:
    when the first command word is executed in the first manner, incrementing an address counter, reading data based on the value of the address counter, and transmitting the data; and
    when the first command word is executed in the second manner, only incrementing the address counter.

6. The method as defined in claim 1, wherein the first command word represents an initialization command, and the executing step includes the sub-steps of:
    when the first command word is executed in the first manner, initializing an address counter, reading data based on the value of the address counter, and transmitting the data; and
    when the first command word is executed in the second manner, only initializing the address counter.

7. A machine-readable medium encoded with a program for controlling an electronic circuit, said program containing instructions for performing the steps of:
    receiving a first command word from a control unit; and
    executing the first command word in either a first manner so as to perform a first function if the first command word is followed by a predetermined dead time, or a second manner so as to perform a second function, which is different from the first function, if a new command word is transmitted before expiration of the predetermined dead time.

8. The machine-readable medium as defined in claim 7, wherein in the executing step, the first command word is executed in the second manner only if the new command word is validly received by the electronic circuit before the expiration of the predetermined dead time.

9. The machine-readable medium as defined in claim 7, wherein in the executing step, the first command word is executed in the second manner only if the new command word is identical to the first command word.

10. The machine-readable medium as defined in claim 9, wherein the first command word represents a program/erase command, and the executing step includes the sub-steps of:
    when the first command word is executed in the first manner, programming at least one memory cell based on the value of an address counter; and
    when the first command word is executed in the second manner, erasing the memory cell.

11. The machine-readable medium as defined in claim 7, wherein the first command word represents a readout command, and the executing step includes the sub-steps of:

when the first command word is executed in the first manner, incrementing an address counter, reading data based on the value of the address counter, and transmitting the data; and when the first command word is executed in the second manner, only incrementing the address counter.

12. The machine-readable medium as defined in claim 7, wherein the first command word represents an initialization command, and the executing step includes the sub-steps of:

when the first command word is executed in the first manner, initializing an address counter, reading data based on the value of the address counter, and transmitting the data; and when the first command word is executed in the second manner, only initializing the address counter.

13. A chip card comprising:

an antenna receiving a signal including command words;

at least one memory; and a control circuit coupled to the antenna and the memory, wherein when a first command word is received, the control circuit performs either a first function if the first command word is followed by a predetermined dead time, or a second function, which is different from the first function, if a new command word is transmitted before expiration of the predetermined dead time.

14. The chip card as defined in claim 13, wherein the control circuit performs the second function only if the new command word is identical to the first command word.

15. The chip card as defined in claim 14, wherein the first function is to program at least one memory cell based on the value of an address counter, and the second function is to erase the memory cell.

16. The chip card as defined in claim 13, wherein the first function is to increment an address counter, read data based on the value of the address counter, and transmit the data, and the second function is to only increment the address counter.

17. The chip card as defined in claim 13, wherein the first function is to initialize an address counter, read data based on the value of the address counter, and transmit the data, and the second function is to only initialize the address counter.

18. A telephone apparatus including a read/write device for contactless control of a chip card, said read/write device comprising:

an antenna transmitting a signal including command words; and a control circuit coupled to the antenna, wherein when a first command word is transmitted, the control circuit either allows a predetermined dead time to pass to instruct the chip card to perform a first function, or transmits a new command word before expiration of the predetermined dead time to instruct the chip card to perform a second function, which is different from the first function.

19. The telephone apparatus as defined in claim 18, wherein the first function is to program at least one memory cell based on the value of an address counter, and the second function is to erase the memory cell.

20. The telephone apparatus as defined in claim 18, wherein the first function is to increment an address counter, read data based on the value of the address counter, and transmit the data, and the second function is to only increment the address counter.

21. The telephone apparatus as defined in claim 18, wherein the first function is to initialize an address counter, read data based on the value of the address counter, and transmit the data, and the second function is to only initialize the address counter.

22. The telephone apparatus as defined in claim 18, wherein the control circuit operates in accordance with specifications of the ISO 14443-2 type B standard.

23. The telephone apparatus as defined in claim 18, wherein the predetermined dead time is at least as long as a time necessary to transition the read/write device from a transmission mode to a reception mode.

* * * * *